(12) United States Patent
Medvedev et al.

(10) Patent No.: US 8,619,620 B2
(45) Date of Patent: Dec. 31, 2013

(54) METHODS AND SYSTEMS FOR TRANSMISSION MODE SELECTION IN A MULTI CHANNEL COMMUNICATION SYSTEM

(75) Inventors: Irina Medvedev, Somerville, MA (US); John W. Ketchum, Harvard, MA (US); J. Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 12/211,811

(22) Filed: Sep. 16, 2008

(65) Prior Publication Data

US 2010/0067401 A1    Mar. 18, 2010

(51) Int. Cl.
*G06F 11/00*    (2006.01)
*H04B 7/005*    (2006.01)

(52) U.S. Cl.
USPC .......................................... 370/253; 370/278

(58) Field of Classification Search
USPC ............ 370/229–232, 234–235, 253, 332–33
See application file for complete search history.

(56) References Cited

U.S. PATENT DOCUMENTS

| | | | |
|---|---|---|---|
| 5,817,147 A | 10/1998 | Wolf | |
| 5,857,147 A * | 1/1999 | Gardner et al. | 455/67.11 |
| 5,940,439 A * | 8/1999 | Kleider et al. | 375/225 |
| 6,252,854 B1 * | 6/2001 | Hortensius et al. | 370/252 |
| 6,253,063 B1 * | 6/2001 | Cudak et al. | 455/63.1 |
| 6,366,763 B1 * | 4/2002 | Ue et al. | 455/69 |
| 6,751,199 B1 * | 6/2004 | Sindhushayana et al. | 370/252 |
| 6,760,882 B1 * | 7/2004 | Catreux et al. | 714/774 |
| 6,802,035 B2 * | 10/2004 | Catreux et al. | 714/746 |
| 7,062,687 B1 * | 6/2006 | Gfeller et al. | 714/704 |
| 7,130,311 B2 * | 10/2006 | Yavuz et al. | 370/468 |
| 7,164,649 B2 | 1/2007 | Walton et al. | |
| 7,408,902 B2 | 8/2008 | Zeira et al. | |
| 7,426,395 B2 * | 9/2008 | Stephens | 455/452.2 |
| 7,508,748 B2 * | 3/2009 | Gesbert et al. | 370/208 |
| 8,488,536 B2 * | 7/2013 | Francos | 370/329 |
| 2002/0018446 A1 * | 2/2002 | Huh et al. | 370/245 |
| 2002/0181407 A1 | 12/2002 | Khullar et al. | |
| 2004/0120411 A1 | 6/2004 | Walton et al. | |
| 2004/0151122 A1 * | 8/2004 | Lau et al. | 370/252 |

(Continued)

FOREIGN PATENT DOCUMENTS

| | | |
|---|---|---|
| EP | 1424802 | 6/2004 |
| EP | 1780924 | 5/2007 |
| WO | WO2006055718 | 5/2006 |

OTHER PUBLICATIONS

International Search Report & Written Opinion—PCT/US2009/055686, International Search Authority—European Patent Office, May 27, 2010.

*Primary Examiner* — Warner Wong
(74) *Attorney, Agent, or Firm* — QAULCOMM IP Department; James Hunt Yancy, Jr.

(57) ABSTRACT

Techniques to select a suitable transmission mode for a data transmission in a multi channel communication system with multiple spatial channels having varying SNRs are presented in this disclosure. For certain embodiments, a closed-loop technique may be applied, in which back-off factors used to calculate an effective SNR value fed back to a transmitter are adjusted. An open-loop rate control scheme is also presented in which a transmitter may select a data rate and number of streams based on whether transmitted packets are received in error at a receiver.

44 Claims, 12 Drawing Sheets

(56) References Cited

U.S. PATENT DOCUMENTS

| | | | |
|---|---|---|---|
| 2004/0258026 A1* | 12/2004 | Lau | 370/335 |
| 2005/0031044 A1* | 2/2005 | Gesbert et al. | 375/259 |
| 2005/0201307 A1* | 9/2005 | Chae et al. | 370/310 |
| 2006/0062242 A1 | 3/2006 | Dacosta | |
| 2006/0104340 A1* | 5/2006 | Walton et al. | 375/227 |
| 2006/0198460 A1 | 9/2006 | Airy et al. | |
| 2008/0031314 A1* | 2/2008 | Priotti et al. | 375/227 |
| 2008/0043611 A1 | 2/2008 | Geile et al. | |
| 2008/0063106 A1 | 3/2008 | Hahm et al. | |
| 2008/0063115 A1* | 3/2008 | Varadarajan et al. | 375/299 |
| 2008/0069038 A1* | 3/2008 | Yamamoto et al. | 370/328 |
| 2008/0227495 A1* | 9/2008 | Kotecha et al. | 455/562.1 |
| 2008/0253484 A1* | 10/2008 | Kakura et al. | 375/343 |
| 2008/0285664 A1 | 11/2008 | Wallace et al. | |
| 2009/0238086 A1 | 9/2009 | Ringstrom et al. | |
| 2009/0262850 A1* | 10/2009 | Catreux et al. | 375/260 |
| 2010/0296407 A1 | 11/2010 | Medvedev et al. | |

* cited by examiner

METHODS AND SYSTEMS FOR TRANSMISSION MODE SELECTION IN A MULTI CHANNEL COMMUNICATION SYSTEM

TECHNICAL FIELD

The present disclosure relates generally to data communication, and more particularly, to techniques for selecting a suitable transmission mode for a data transmission in a multi channel communication system.

BACKGROUND

A multi-channel communication system utilizes multiple "transmission" channels for data transmission. These transmission channels may be formed in the time domain, frequency domain, spatial domain, or a combination thereof. For example, the multiple transmission channels may correspond to different time slots in a time division multiplex (TDM) communication system, different frequency subbands in an orthogonal frequency division multiplex (OFDM) communication system, or different spatial channels in a multiple-input multiple-output (MIMO) communication system. The TDM, OFDM and MIMO systems are described in further detail below.

The multiple transmission channels in the multi-channel communication system may experience different channel conditions (e.g., different fading, multipath and interference effects) and may achieve different signal-to-noise-and-interference ratios (SNRs). The SNR of a transmission channel determines its transmission capability, which is typically quantified by a particular transmission rate that may be reliably achieved on the transmission channel. If the SNR varies from transmission channel to transmission channel, then the supported transmission rate would also vary from channel to channel. Moreover, since the channel conditions typically vary with time, the transmission rates supported by the transmission channels would also vary with time.

A major challenge in a coded communication system is selecting the appropriate transmission mode(s) to use for data transmission based on the channel conditions. As used herein, a "transmission mode" may indicate a particular transmission rate or information bit rate, a particular coding scheme, a particular modulation scheme, or a combination thereof, to use for a given data transmission. The goal of the transmission mode selection should be to maximize throughput on the multiple transmission channels while meeting certain quality objectives, which may be quantified by a particular packet error rate (PER). Each transmission channel may also be referred to as a spatial channel. Each spatial channel may carry a data transmission, herein referred to as a spatial stream or spatial data stream.

One straightforward technique is to select a particular transmission mode for each of the multiple transmission channels based on its SNR (i.e., the transmission mode selection is done on a per transmission channel basis to "bit load" each transmission channel according to its SNR). The data for each transmission channel would then be sent at the transmission rate and with the coding and modulation schemes associated with the transmission mode selected for that transmission channel. However, this technique has some major drawbacks. First, coding individually for each transmission channel can significantly increase the complexity of the data processing at both a transmitter and a receiver. Second, coding individually for each transmission channel may greatly increase coding and decoding delay. Third, a high feedback rate may be needed to send back information (e.g., the SNR or transmission mode) for each transmission channel, which is needed by the transmitter to code and modulate data on a channel-by-channel basis.

Another technique is to use a common transmission mode for all spatial data streams or groups of spatial data streams. This technique avoids the major drawbacks of the bit-loading technique. However, if a data transmission is sent on multiple transmission channels with varying SNRs, then the SNR would vary correspondingly across the received data transmission. The challenge is then to select the proper transmission mode to use for the data transmission in light of the varying SNRs, so that the data transmission can be reliably received. If the transmission rate for the selected transmission mode is too high, then the entire data transmission would be received in error. Conversely, if the transmission rate for the selected transmission mode is too low, then the transmission capacity of the multiple transmission channels is under utilized.

There is therefore a need in the art for techniques to determine a suitable transmission mode for data transmission on multiple transmission channels having varying SNRs.

SUMMARY OF THE DISCLOSURE

Certain embodiments of the present disclosure provide techniques for controlling the data rate for transmissions between transmitting and receiving terminals. These techniques may include "closed-loop" rate control based on rate selection information fed back from a receiver, "open-loop" rate control based on whether a packet is received in error, and combinations thereof.

For certain embodiments, a method for open-loop rate control for transmissions between a transmitting terminal and a receiving terminal in a multi-channel wireless communications system is provided. The method generally includes transmitting one or more data packets using a plurality of spatial streams at a transmission rate and adjusting the transmission rate for transmitting subsequent packets based on whether one or more of the transmitted data packets were received in error.

Certain embodiments of the present disclosure provide a method of selecting transmission modes in multi-channel communications system. The method generally includes calculating a signal to noise ratio (SNR) metric based on SNR values for a plurality of spatial streams, calculating an effective SNR metric as a function of, at least, the SNR metric and one or more back-off parameters, monitoring packets errors, adjusting one or more of the back-off parameters based on the monitored packet errors, selecting a data rate based on the effective SNR metric, and generating rate feedback based on the selected data rate.

Certain embodiments of the present disclosure provide an apparatus for open-loop rate control for transmissions between a transmitting terminal and a receiving terminal in a multi-channel wireless communications system. The apparatus generally includes logic for transmitting one or more data packets using a plurality of spatial streams at a transmission rate and logic for adjusting the transmission rate for transmitting subsequent packets based on whether one or more of the transmitted data packets were received in error.

Certain embodiments of the present disclosure provide an apparatus for selecting transmission modes in multi-channel communications system. The apparatus generally includes logic for calculating a signal to noise ratio (SNR) metric based on SNR values for a plurality of spatial streams, logic for calculating an effective SNR metric as a function of, at least, the SNR metric and one or more back-off parameters, logic for monitoring packets errors, logic for adjusting one or more of the back-off parameters based on the monitored packet errors, logic for selecting a data rate based on the effective SNR metric, and logic for generating rate feedback based on the selected data rate.

Certain embodiments of the present disclosure provide an apparatus for open-loop rate control for transmissions between a transmitting terminal and a receiving terminal in a multi-channel wireless communications system. The apparatus generally includes means for transmitting one or more data packets using a plurality of spatial streams at a transmission rate and means for adjusting the transmission rate for transmitting subsequent packets based on whether one or more of the transmitted data packets were received in error.

Certain embodiments of the present disclosure provide an apparatus for selecting transmission modes in multi-channel communications system. The apparatus generally includes means for calculating a signal to noise ratio (SNR) metric based on SNR values for a plurality of spatial streams, means for calculating an effective SNR metric as a function of, at least, the SNR metric and one or more back-off parameters, means for monitoring packets errors, means for adjusting one or more of the back-off parameters based on the monitored packet errors, means for selecting a data rate based on the effective SNR metric, and means for generating rate feedback based on the selected data rate.

Certain embodiments of the present disclosure generally include a computer-program product for open-loop rate control for transmissions between a transmitting terminal and a receiving terminal in a multi-channel wireless communications system, comprising a computer readable medium having instructions stored thereon, the instructions being executable by one or more processors. The instructions generally include instructions for transmitting one or more data packets using a plurality of spatial streams at a transmission rate and instructions for adjusting the transmission rate for transmitting subsequent packets based on whether one or more of the transmitted data packets were received in error.

Certain embodiments of the present disclosure generally include a computer-program product for selecting transmission modes in multi-channel communications system, comprising a computer readable medium having instructions stored thereon, the instructions being executable by one or more processors. The instructions generally include instructions for calculating a signal to noise ratio (SNR) metric based on SNR values for a plurality of spatial streams, instructions for calculating an effective SNR metric as a function of, at least, the SNR metric and one or more back-off parameters, instructions for monitoring packets errors, instructions for adjusting one or more of the back-off parameters based on the monitored packet errors, instructions for selecting a data rate based on the effective SNR metric, and instructions for generating rate feedback based on the selected data rate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
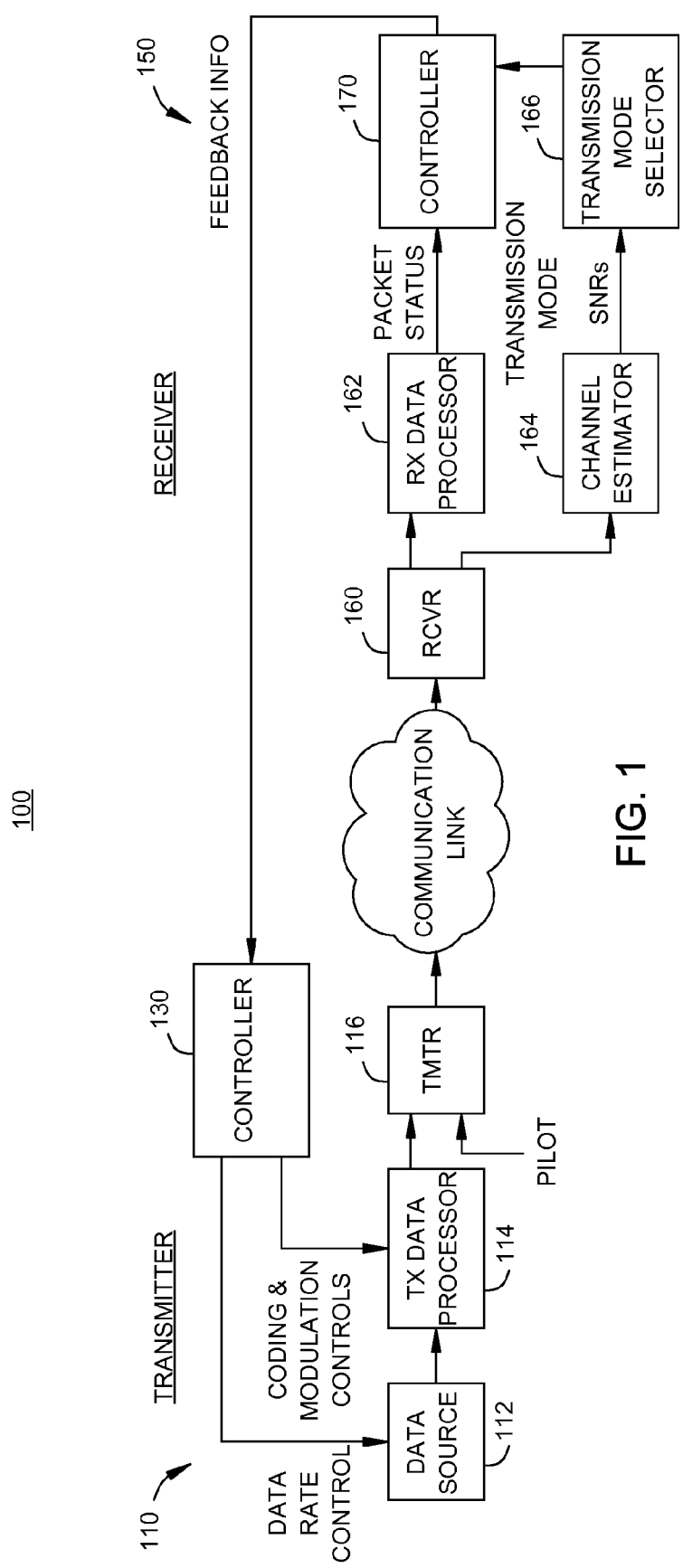
FIG. 1 illustrates a transmitter and a receiver in a multi-channel communication system.

Certain embodiments of the present disclosure provide techniques for controlling the data rate of transmissions between a transmitting unit (a transmitter) and a receiving terminal (a receiver). The techniques presented herein may include both "closed-loop" and "open-loop" control techniques. In general, for closed-loop data rate control, a receiver may feed back a selected data rate and an associated number of data streams to a transmitter. On the other hand, for open-loop rate control, the receiver may not provide rate feedback to the transmitter, and the transmitter may select a data rate and associated number of data streams based only on whether a transmitted packet was received in error.

For certain embodiments, a system may utilize a combination of the open-loop and closed-loop rate control techniques presented herein. For example, a system may initially (or periodically) utilize closed-loop rate control to select an initial data rate and number of spatial steams and subsequently utilize open-loop rate control to make adjustments to the initial selection. Utilizing open-loop rate control, at least occasionally, may help conserve resources, for example, by eliminating the bandwidth needed to feed back a rate selection and associated number of data streams.

The word "exemplary" is used herein to mean "serving as an example, instance, or illustration." Any embodiment or design described herein as "exemplary" is not necessarily to be construed as preferred or advantageous over other embodiments or designs.

The transmission mode selection techniques described herein may be used for various types of multi-channel communication system having multiple transmission channels that may be used for data transmission. For example, these techniques may be used for TDM systems, OFDM-based systems, MIMO systems, MIMO systems that utilize OFDM (i.e., MIMO-OFDM systems), and so on.

A TDM system may transmit data in frames, each of which may be of a particular time duration. Each frame may include multiple ($N_{TS}$) time slots that may be assigned different indices. $N_{TS}$ transmission channels may be formed for the $N_{TS}$ time slots in each frame.

An OFDM system effectively partitions the overall system bandwidth into multiple ($N_F$) orthogonal subbands, which may also be referred to as tones, bins, and frequency channels. Each subband is associated with a respective carrier that may be modulated with data. $N_F$ transmission channels may be formed for the $N_F$ subbands.

A MIMO system employs multiple ($N_T$) transmit antennas and multiple ($N_R$) receive antennas for data transmission, and is denoted as an ($N_T$, $N_R$) system. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial channel of the MIMO channel. Each spatial channel may carry a data transmission, herein referred to as a spatial stream. The number of spatial channels is determined by a channel response matrix H that describes the response between the $N_T$ transmit and $N_R$ receive antennas. For simplicity, the following description assumes that the channel response matrix H is full rank, in which case the number of used spatial channels is given as $N_S \leq \min\{N_T, N_R\}$. $N_S$ transmission channels may be formed for the $N_S$ spatial channels.

A MIMO-OFDM system has $N_S$ spatial channels for each of the $N_F$ subbands. A transmission channel may be formed for each spatial channel of each subband. $N_F \cdot N_S$ transmission channels would then be available for data transmission between the $N_T$ transmit antennas and $N_R$ receive antennas.

In general, multiple transmission channels may be formed in various manners, some examples of which are described above. Each transmission channel is associated with a received SNR that is indicative of the transmission capability of that channel. The received SNR of a given transmission channel may be estimated by a receiver, for example, based on a pilot sent on that transmission channel.

FIG. 1 shows a block diagram of a transmitter 110 and a receiver 150 in a multi-channel communication system 100. At transmitter 110, traffic data is provided from a data source 112 to a transmit (TX) data processor 114, which demultiplexes the traffic data into $N_S$ data streams, where $N_S \geq 1$. Each data stream may be independently processed and transmitted on a respective group of transmission channels. Each data stream may be associated with a particular transmission mode that indicates a set of parameter values for that data stream. For example, the transmission mode for each spatial data stream may indicate (or may be associated with) a particular transmission rate or information bit rate, a particular code rate, a particular interleaving scheme, a particular modulation scheme, or any combination thereof, to use for that data stream. For a given transmission mode, the transmission rate may be determined by the coding rate and the modulation scheme associated with that transmission mode. An exemplary set of transmission modes, along with an example signal-to-noise ratio (SNR) in units of decibels (dB) required for a 1% packet error rate (PER) and corresponding spectral efficiency (illustratively in units of bits-per-sec/Hz) as a representation of the transmission rate, are given in Table 1. For each data stream, the transmission rate is determined by a transmission rate control, the coding rate is determined by a coding control, the interleaving scheme is determined by an interleaving control, and the modulation scheme is determined by a modulation control. These controls are provided by a controller 130 and are generated based on feedback information received from receiver 150.

TABLE 1

| Transmission Mode Index | Spectral Efficiency (bps/Hz) | Code Rate | Modulation Scheme | Required SNR (dB) |
|---|---|---|---|---|
| 0 | 0.0 | — | — | — |
| 1 | 0.25 | 1/4 | BPSK | −1.8 |
| 2 | 0.5 | 1/2 | BPSK | 1.2 |
| 3 | 1.0 | 1/2 | QPSK | 4.2 |
| 4 | 1.5 | 3/4 | QPSK | 6.8 |
| 5 | 2.0 | 1/2 | 16 QAM | 10.1 |
| 6 | 2.5 | 5/8 | 16 QAM | 11.7 |
| 7 | 3.0 | 3/4 | 16 QAM | 13.2 |
| 8 | 3.5 | 7/12 | 64 QAM | 16.2 |
| 9 | 4.0 | 2/3 | 64 QAM | 17.4 |
| 10 | 4.5 | 3/4 | 64 QAM | 18.8 |
| 11 | 5.0 | 5/6 | 64 QAM | 20.0 |
| 12 | 6.0 | 3/4 | 256 QAM | 24.2 |
| 13 | 7.0 | 7/8 | 256 QAM | 26.3 |

For each data stream, TX data processor 114 codes, interleaves, and modulates the data in accordance with the coding, interleaving, and modulation schemes selected for that data stream to provide a corresponding stream of modulation symbols. TX data processor 114 provides $N_S$ modulation symbol streams for the $N_S$ data streams.

A transmitter unit (TMTR) 116 then receives and processes the $N_S$ modulation symbol streams in a manner specified by the system. For example, transmitter unit 116 may perform OFDM processing for an OFDM system, spatial processing for a MIMO system, or both spatial and OFDM processing for a MIMO-OFDM system. A pilot may also be transmitted to receiver 150 to assist it perform a number of functions such as channel estimation, acquisition, frequency and timing synchronization, coherent demodulation, and so on. In this case, transmitter unit 116 may receive and multiplex pilot symbols with the modulation symbols. Transmitter unit 116 provides a modulated signal for each antenna used for data transmission.

Each modulated signal is then transmitted from a respective transmit antenna over a wireless communication link to receiver 150. The communication link distorts the modulated signals with a particular channel response and further degrades the modulated signals with (1) additive white Gaussian noise (AWGN) having a variance of $N_0$ and (2) possibly interference from other transmission sources.

At receiver 150, the transmitted signals are received by each receive antenna, and the received signal from each antenna is provided to a receiver unit (RCVR) 160. Receiver unit 160 conditions and digitizes each received signal to provide a corresponding stream of samples. Receiver unit 160 further processes the samples in a manner that is complementary to that performed by transmitter unit 116 to provide $N_S$ streams of "recovered" symbols, which are estimates of the $N_S$ streams of modulation symbols sent by transmitter 110. The recovered symbol streams are then provided to a receive (RX) data processor 162 and processed to obtain decoded data for the transmitted data streams. The processing by RX data processor 162 may include demodulation (i.e., symbol demapping), deinterleaving, and decoding. RX data processor 162 may further provide the status of each received data packet.

Receiver unit 160 may also provide "received" symbols (i.e., symbols after OFDM processing but prior to spatial processing by receiver unit 160) and/or recovered symbols to a channel estimator 164. Channel estimator 164 may then process these symbols to obtain an SNR estimate for each transmission channel used for data transmission. The SNR estimates are typically obtained based on received pilot symbols, but may also be obtained based on received data symbols or a combination of received pilot and data symbols. A transmission mode selector 166 receives the SNR estimates from channel estimator 164 and determines a suitable number of spatial streams, $N_S$ ranging from 0 to min $\{N_T, N_R\}$, and a suitable transmission rate for these $N_S$ spatial data streams.

A controller 170 receives a transmission mode for the $N_S$ spatial data streams from transmission mode selector 166 and the packet status from RX data processor 162 and assembles feedback information for transmitter 110. The feedback information may include the number of utilized spatial data streams ($N_S$), transmission mode for the $N_S$ data streams, acknowledgments (ACKs) and negative acknowledgments (NAKs) for received data packets, and/or other information. The feedback information is then sent to transmitter 110 and used to adjust the next transmission. For example, transmitter 110 may use the feedback information to adjust the number of utilized data streams, transmission rate, the coding scheme, the modulation scheme, or any combination thereof, for each data stream that will be sent to receiver 150. The feedback information is used to increase the efficiency of the system by allowing data to be transmitted at the best-known settings supported by the communication link.

In the embodiment shown in FIG. 1, the transmission mode selection is performed by receiver 150 and the selected transmission mode is sent back to transmitter 110. In other embodiments, the transmission mode selection may be performed by (1) the transmitter based on feedback information provided by the receiver and/or other information obtained by the transmitter or (2) jointly by both the transmitter and receiver. In some ways, the transmitter may be active in transmission mode selection as previously described because the feedback from the receiver is a recommendation. Therefore, the transmitter may, for example, downgrade the recommendation if too much time has passed between the initial transmission upon which the recommendation was based and the next transmission which uses the recommended transmission rates.

An AWGN communication link (e.g., an AWGN channel) is characterized by a frequency response that is flat across the transmission channels. For an AWGN channel, the transmission channels achieve similar received SNRs. If a data packet is transmitted on a group of transmission channels with similar received SNRs, then the SNR would be approximately constant across the entire data packet. For "constant SNR" data packets, the relationship between required SNR and transmission rate for a particular level of performance is well known in the art. The desired level of performance may be quantified by a particular packet error rate (PER), frame error rate (FER), block error rate (BLER), bit error rate (BER), or some other measure. A suitable transmission mode may readily be selected based on the received SNR of the AWGN transmission channels.

However, as noted above, the multiple transmission channels may experience different channel conditions and achieve different received SNRs. If a data packet is transmitted on a group of transmission channels with different received SNRs, then the SNR would vary correspondingly across the received data packet. This problem of "varying SNR" packet is exacerbated for a wideband communication system and for a "multipath" channel with frequency selective fading (i.e., a response that is not flat across the transmission channels). The techniques described herein address a major challenge for a coded multi-channel communication system, which is to determine the maximum transmission rate that may be used for each data stream sent on a group of transmission channels with varying SNRs for a particular desired level of performance.

Figure 2:
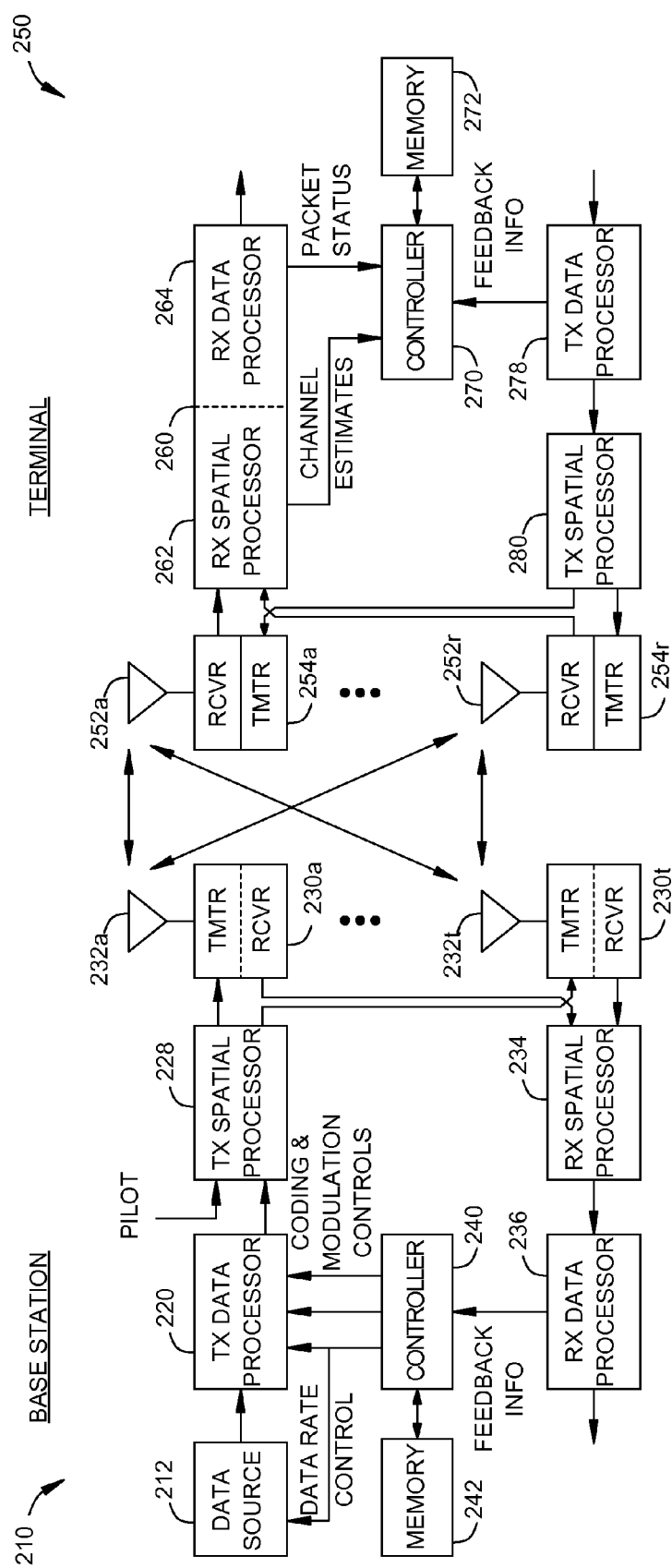
FIG. 2 illustrates a base station and a user terminal in a MIMO-OFDM system.

FIG. 2 shows a block diagram of an embodiment of a base station 210 and a terminal 250 in a MIMO-OFDM system. Base station 210 may be used for transmitter 110 and terminal 250 may be used for receiver 150 in FIG. 1. For simplicity, FIG. 2 only shows data transmission on the downlink (i.e., forward link) from the base station to the terminal.

At base station 210, traffic data is provided from a data source 212 to a TX data processor 220. TX data processor 220 demultiplexes the traffic data into $N_S$ data streams, where $N_S \geq 1$, and further formats, codes, interleaves, and modulates each data stream to provide a corresponding modulation symbol stream. The transmission rate, coding, interleaving and modulation for each data stream may be determined by a transmission rate control, a coding control, an interleaving control and a modulation control, respectively, provided by a controller 240. TX data processor 220 provides $N_S$ modulation symbol streams to a TX spatial processor 228.

TX spatial processor 228 processes the $N_S$ modulation symbol streams in accordance with a selected transmission scheme (e.g., spatial diversity, spatial multiplexing, frequency diversity, or temporal diversity) to provide $N_T$ transmit symbol streams. TX spatial processor 228 may also receive and multiplex pilot symbols with the transmit symbols. TX spatial processor 228 provides $N_T$ transmit symbol streams to $N_T$ transmitter units (TMTR) 230a through 230t.

Each transmitter unit 230 performs OFDM processing on its transmit symbol stream to provide a corresponding OFDM symbol stream, which is further processed to generate a modulated signal suitable for transmission over the wireless communication link. The $N_T$ modulated signals from transmitter units 230a through 230t are then transmitted via $N_T$ antennas 232a through 232t, respectively.

At terminal 250, the transmitted signals are received by each of $N_R$ antennas 252a through 252r, and the received signal from each antenna is provided to an associated receiver unit (RCVR) 254. Each receiver 254 conditions and digitizes its received signal to provide a stream of samples, which is further processed to provide a corresponding stream of received symbols. The $N_R$ received symbol streams from receiver units 254a through 254r are then provided to a receiver processor 260, which includes an RX spatial processor 262 and an RX data processor 264.

RX spatial processor 262 processes the $N_R$ received symbol streams in accordance with the selected transmission scheme to provide $N_S$ recovered symbol streams, which are estimates of the $N_S$ modulation symbol streams transmitted by base station 210. RX data processor 264 then decodes each recovered symbol stream to provide a corresponding decoded data stream, which is an estimate of the data stream transmitted by base station 210. The processing by RX spatial processor 262 and RX data processor 264 is complementary to that performed by TX spatial processor 228 and TX data processor 220, respectively, at base station 210.

As shown in FIG. 2, RX spatial processor 262 may derive estimates of certain channel characteristics (e.g., the channel response and noise variance) and provide the channel estimates to a controller 270. RX data processor 264 may also provide the status of each received data packet. Based on the various types of information that are received from RX spatial processor 262 and RX data processor 264 in the case of closed-loop rate control, controller 270 determines a suitable transmission mode for a plurality of spatial data streams. Controller 270 also provides feedback information, which may include a recommendation on the number of utilized spatial streams, selected transmission mode for all utilized spatial streams, the channel response estimates, ACKs and/or NAKs for the receive data packets, and so on, or any combination thereof. In the case of open-loop rate control, the only feedback information may be ACKs and/or NAKs indicating whether packets were successfully received. The feedback information is processed by a TX data processor 278 and a TX spatial processor 280, conditioned by transmitter units 254a through 254r, and transmitted from antennas 252a through 252r back to base station 210.

At base station 210, the transmitted signals from terminal 250 are received by antennas 232a through 232t, conditioned by receiver units 230a through 230t, and processed by an RX spatial processor 234 and an RX data processor 236 to recover the feedback information sent by terminal 250. The feedback information is then provided to controller 240 and used to control the processing of the recommended number, $N_S$, of spatial data streams sent to terminal 250. For example, the transmission rate for a plurality of data streams may be determined based on the selected transmission mode provided by terminal 250. The coding and modulation schemes for selected transmission mode are also determined by controller 240 and indicated by the coding and modulation controls provided to TX data processor 220 and TX spatial processor 228. The received ACK/NAK may be used to initiate either a full retransmission or an incremental transmission of each data packet received in error by the terminal. The received ACK/NAK may be also used to adjust transmission mode and number of spatial streams in open-loop rate control. For an incremental transmission, a small portion of a data packet received in error is transmitted to allow the terminal to recover the packet.

Controllers 240 and 270 direct the operation at base station 210 and terminal 250, respectively. Memory units 242 and 272 provide storage for program codes and data used by controllers 240 and 270, respectively.

The channel response and the noise variance (e.g., based on the received pilot symbols) are estimated at the receiver and provided to controller 270. Controller 270 implements transmission mode selector 166 in FIG. 1, performs various functions related to transmission mode selection, and determines a suitable transmission mode for a plurality of spatial data streams based on the channel estimates. Memory unit 272 may store a look-up table 274 for supported transmission modes and their required SNRs. The transmission mode selector 166 can determine a number of utilized data streams $N_S$ and a suitable transmission mode for the $N_S$ data streams. Each data stream is transmitted on a respective group of transmission channels.

Closed-Loop Rate Control

Figure 3:
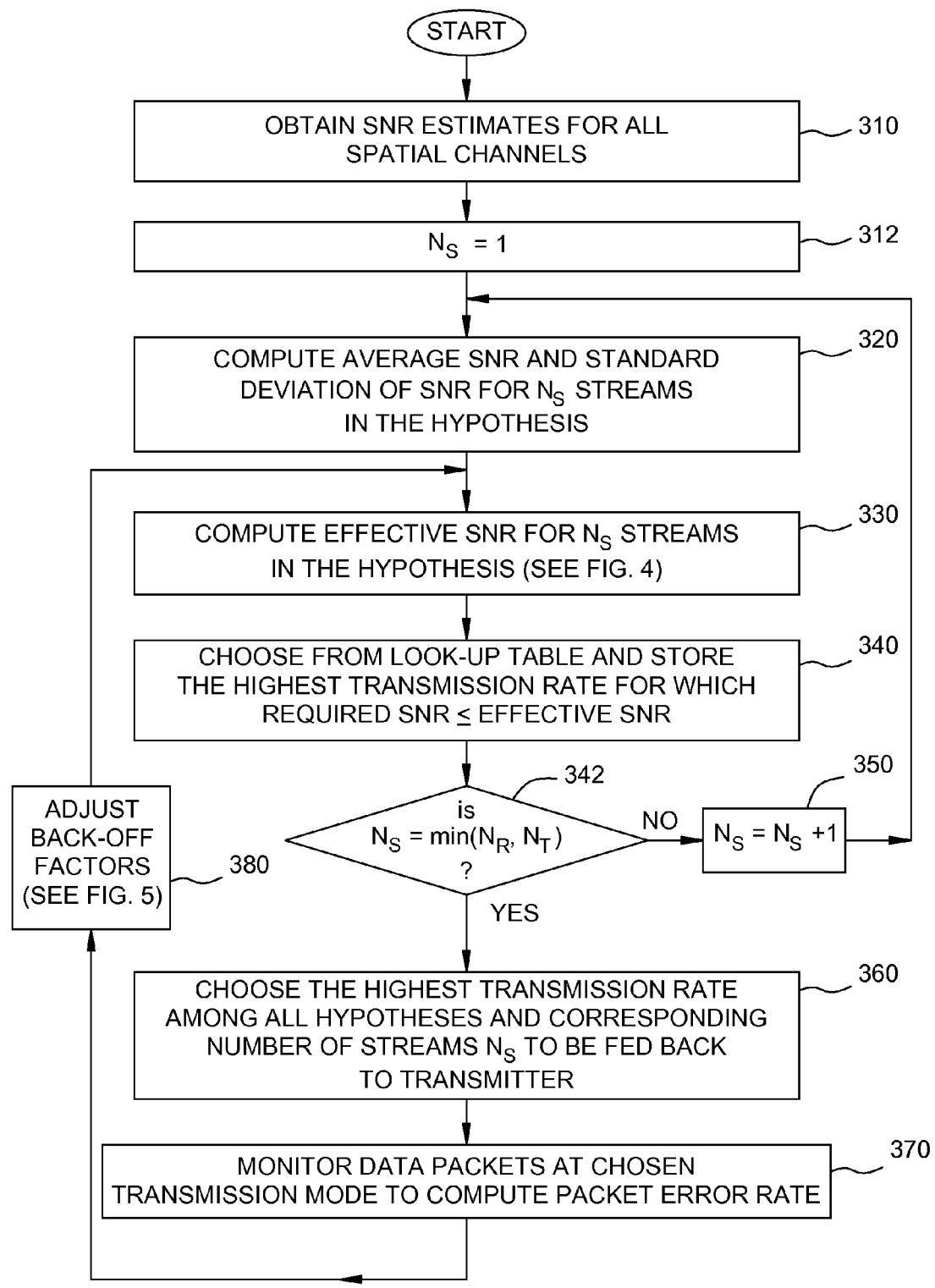
FIG. 3 illustrates example operations for the selection of a common transmission mode for a plurality of spatial streams with outer loop for transmission mode control.

FIG. 3 illustrates example operations that may be performed, for example, within transmission mode selector 166 for determining the common transmission mode for different data streams sent on spatial channels with varying SNRs. Initially, at 310, SNR estimates for all $N_{S_{MAX}} = \min\{N_r, N_t\}$ spatial streams in the system may be computed (e.g., based on pilot symbols). The SNR estimate for the particular subband of a given spatial channel may be obtained as:

$$\gamma_i(l) = 10\log_{10}\left(\frac{|s_i(l)|^2}{N_0}\right), \text{ for } i = 1, \ldots, N_{S_{MAX}}, l \in L, \text{ (dB)} \quad (1)$$

where i is the spatial stream index, index l is the subband index, $s_i(l)$ is the complex gain for subband l of spatial channel i, $N_0$ is the noise variance for subband l of spatial channel i, and $\gamma_i(l)$ is the SNR estimate for subband l of spatial channel i. As shown in Eq. 1, the SNR estimates for the spatial channels may be given in units of dB. The number of considered spatial streams in the hypothesis $N_S$ may be initialized to one, at 312, and the number of spatial streams in the hypothesis will be eventually incremented, as illustrated in FIG. 3.

The advanced receiver algorithms that may be applied at the receiver typically do not produce an associated direct observation of post-detection SNR, which is typically utilized for rate selection in closed-loop rate control. Therefore, for certain embodiments, to allow for closed-loop rate control, an MMSE calculation that may not be otherwise part of the receiver algorithm can be utilized to provide a channel quality metric, which, with further static and dynamic adjustments, can be used to drive rate selection for advanced receiver algorithms that do not normally produce a suitable SNR metric.

The MMSE calculation that may be implemented at the receiver may be defined, for example, by the following equation:

$$W_{MMSE}(l) = (H(l)H^H(l) + N_0 I)^{-1} H^H(l), \quad (2)$$

where H(l) is the channel response matrix for subband l, $H^H(l)$ is the conjugate-transpose (Hermitian) version of the channel matrix H(l), and I is the identity matrix.

According to equations (1) and (2) the received SNR for each subband of each spatial stream may then be expressed as:

$$\gamma_i(l) = 10\log_{10}\left(\frac{|w_i^H(l) h_i(l)|^2}{N_0}\right), l \in L, i = 1, \ldots, N_{S_{MAX}}, \text{ (dB)} \quad (3)$$

where $w_i(l)$ is the i-th column of $W_{MMSE}(l)$ from equation (2), $\gamma_i(l)$ is the received SNR for subband l of spatial data stream i, and $h_i(l)$ is the i-th column of the channel response matrix H(l). Equation (3) represents an exemplary method of computing the received SNR in a MIMO-OFDM system whereby a linear MMSE equalization is applied as a part of more advanced detection algorithm. Other methods for computing the SNR may also be utilized.

At 320, the average SNR may be computed over the number of utilized spatial streams hypotheses $N_S$ as follows:

$$\gamma_{avg} = \frac{1}{N_S N_F} \sum_{i=1}^{N_S} \sum_{l=1}^{N_F} \gamma_i(l), \text{ (dB)} \quad (4)$$

where i is an index of the spatial channels used for the transmission of data streams (spatial stream index), $N_F$ is the number of data subbands, $\gamma_i(l)$ is the SNR estimate for subband l of spatial channel i, and $\gamma_{avg}$ is the average SNR for the $N_F$ subbands and $N_S$ spatial channels used for the transmission of data streams.

Also, at 320, the corresponding unbiased standard deviation of the SNR estimates may be computed as follows:

$$\sigma_\gamma = \sqrt{\frac{1}{N_F N_S - 1} \sum_{i=1}^{N_S} \sum_{l=1}^{N_F} (\gamma_i(l) - \gamma_{avg})^2}, \quad (5)$$

At 330, the effective SNR for $N_S$ spatial streams in the hypothesis may then be computed based on the average SNR, standard deviation of SNR estimates, and back-off factors, as follows:

$$\gamma_{\mathit{eff},N_S} = (\gamma_{avg} - k_{N_S}\sigma_\gamma + a_{N_S})^{C_{N_S}} + b_{N_S}, \qquad (6)$$

where $k_{N_S}$ is the back-off factor dependent on the number of considered spatial streams that multiplies the standard deviation; $C_{N_S}$ is the factor dependent on the number of considered spatial streams that converts the observable SNR to the unobservable SNR of the enhanced demodulation technique, such as sphere decoder; and $a_{N_S}$ and $b_{N_S}$ are back-ff factors that may be dependent on some other observation or parameter.

The factors $a_{N_S}$, $b_{N_S}$, $C_{N_S}$, and $k_{N_S}$ may vary with the number of spatial streams $N_S$ being considered in the hypothesis. The number of considered spatial streams in the hypothesis may be incremented from one hypothesis to another. In one embodiment, the values of the back-off factors for use in a MIMO Wireless Local Area Network (WLAN) system with a maximum of four different spatial data streams may be:

$$[k_{N_S=1}, k_{N_S=2}, k_{N_S=3}, k_{N_S=4}] = [1, 0.75, 0.5, 0.25] \qquad (7)$$

$$[C_{N_S=1}, C_{N_S=2}, C_{N_S=3}, C_{N_S=4}] = [1, 26/25, 20/19, 16/15]. \qquad (8)$$

In another embodiment, the demodulation technique, such as MMSE or zero-forcing (ZF), has an observable SNR, for which case $C_{N_S}$ may be unity for all $N_S=1, \ldots, \min\{N_R, N_T\}$.

The back-off factor $k_{N_S}$ is selected based on various system specific factors and typically ranges from 0 to 1 (i.e., $1 \geq k_{N_S} \geq 0$). The back-ff factor $k_{N_S}$ may be a function of the minimum free distance, $d_{min}$, of the specific code used by the system. The general concept of $d_{min}$ is well known in the art, and the $d_{min}$ of any given code is either known or may be ascertained in a manner known in the art. The back-off factor $k_{N_S}$ may be smaller for turbo codes and larger for convolutional codes. As will be described in greater detail below, for certain embodiments, on or more of these back-off factors may be adjusted using an outer loop at the receiver.

For a given type of code (i.e., convolutional or turbo), the constraint length K of the code also has an impact on the back-off factor. A smaller back-off factor may be used for a larger constraint length, and vice versa. For a given system design, the back-off factor $k_{N_S}$ may be determined based on simulation (for a large number of realizations), empirical measurements, and so on.

The system may be designed to support a set of transmission modes. Each supported transmission mode is associated with a particular minimum SNR required to achieve the desired level of performance, which may be determined as described in greater detail below.

For certain embodiments, a look-up table of supported transmission rates and their required SNRs may be consulted, at 340, to obtain a transmission mode. For example, the highest rate for which the required SNR (e.g., obtained by performing a table lookup) is lower than the effective SNR (e.g., calculated by Eq. 6) may be chosen for the $N_S$ spatial streams in the hypothesis. The look-up table thus selects the highest possible transmission rate for a plurality of spatial streams based on the effective SNR. Once the transmission rates are obtained for all $N_{S_{MAX}} = \min\{N_r, N_t\}$ hypotheses (decision step 342), then the highest transmission rate, as well as the corresponding number of utilized spatial data streams may be selected among all hypotheses, at 360. At 370, received packets are monitored for errors. For example, packet error rate (PER) may be calculated over a certain number of packets. As will be described in greater detail below, the calculated PER may be used to increase, decrease, or not change the back-off factors, at 380, so that a desired PER may be achieved.

For certain embodiments, back-off factors may be adjusted in a manner that results in an effective SNR associated with an increased data rate if the packet error rate falls below a first threshold and/or results in an effective SNR associated with a decreased data rate if the packet error rate exceeds a second threshold. For certain embodiments, the first and second thresholds may be set and/or monitored over different periods, for example, to ensure the data rate is gradually increased when a low packet error rate is seen for an extended period of time, but rapidly decreased when a higher packet error rate is detected.

The operations at 320 through 350 may be performed independently for each hypothesis, while the number of considered spatial streams $N_S$ may be incremented from one hypothesis to another, at 350. The information about chosen transmission modes and the number of spatial data streams may be sent back to the transmitter via the feedback channel.

Figure 4:
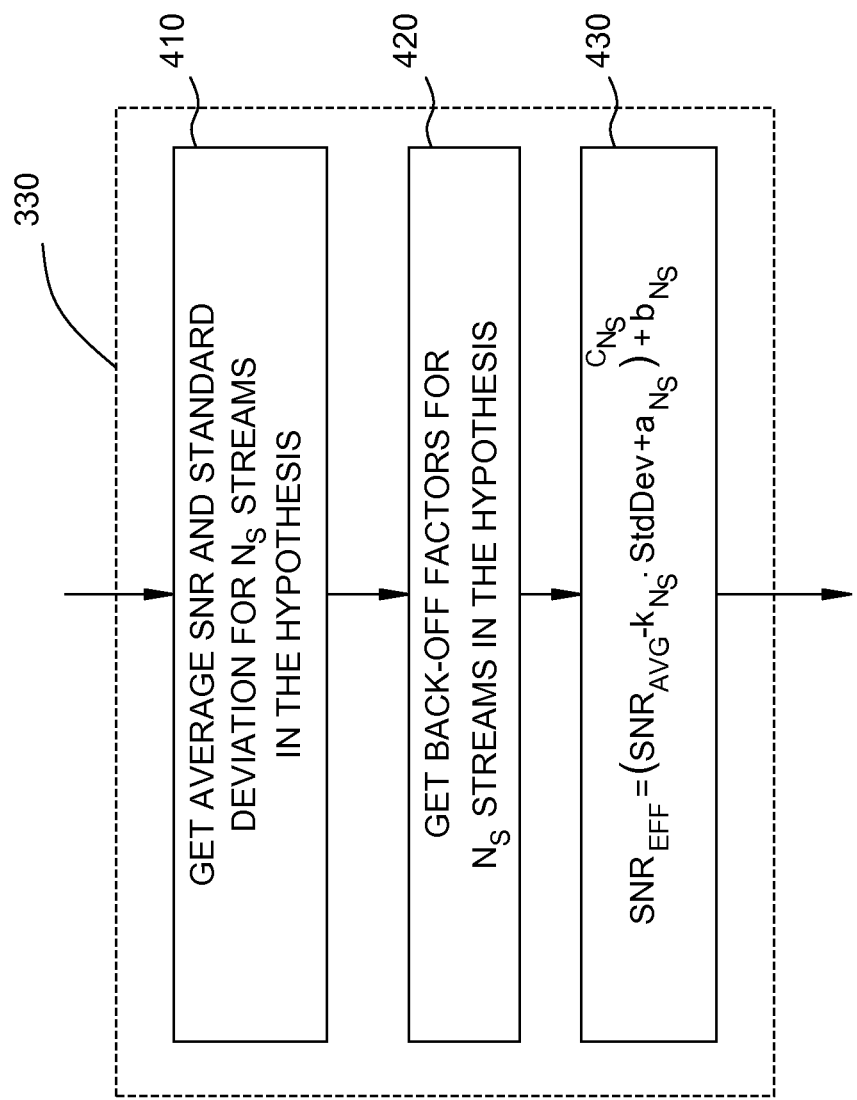
FIG. 4 illustrates example operations for computing the effective SNR for a plurality of spatial streams.

FIG. 4 shows operation 330 in more details. Operation 410 utilizes the average SNR and standard deviation of SNR estimates computed at 320 in FIG. 3 for $N_S$ spatial streams in the hypothesis. Values of the back-off factors that depend on the number of considered spatial streams, $N_S$, in the hypothesis are also available at 420 and may be adjusted in the outer loop or pre-determined in advance. At 430, the effective SNR is calculated for $N_S$ spatial streams in the hypothesis according to Eq. 6.

While the example embodiment described above with reference to FIGS. 3 and 4 involves a common transmission mode used for all streams, the techniques described herein may be used to select varying transmission mode per stream (i.e. where not all streams must have the same transmission mode). The techniques may be used to select an independent transmission mode per stream or varying transmission mode across streams. In the case of an independent transmission mode per stream, the transmission mode may be selected independently for each stream, for example, via a look-up table per stream or some other suitable technique. In the case of varying transmission mode across streams, only certain combinations of transmission modes across streams may be allowed. In both of these cases, an effective SNR is calculated for each stream in the hypothesis. The techniques described above, to select rates based on effective SNR values, however, may be applied for both of these cases.

For independent transmission mode per stream, for example, once an effective SNR for a given stream is calculated, the highest rate for which the required SNR is lower than the effective SNR may be selected for that stream. In this case, the effective SNR calculation and table lookup may be performed for each stream in the hypothesis. For varying transmission mode per stream, $N_S$ effective SNRs may be obtained, but there may only be one table look up, for example, with the requirement that each stream's effective SNR must be greater than the required SNR on each stream.

While selecting an independent transmission mode per stream or varying transmission mode per stream have been presented as illustrative examples, those skilled in the art will appreciate that the techniques presented herein to select a rate based on effective SNR values may also be applied with various other rate selection approaches where not all streams must have the same transmission mode.

Each supported transmission mode may be associated with a particular spectral efficiency, a particular code rate, a particular modulation scheme, and the minimum SNR required to achieve pre-determined PER for a non-fading, AWGN channel. The spectral efficiency generally refers to the transmission rate (i.e., the information bit rate) normalized by the system bandwidth, and is given in units of bits per second per Hertz (bps/Hz). The code rate and modulation scheme for each transmission mode may be specific to a particular system design. For certain embodiments, a transmission mode may be included corresponding to a null transmission rate (i.e., no data transmission). For each transmission mode with a non-zero transmission rate, the required SNR may be obtained based on the specific system design (i.e., the particular code rate, interleaving scheme, modulation scheme, and so on, used by the system for that transmission mode) and for an AWGN channel. The required SNR may be obtained by computation, computer simulation, empirical measurements, and so on, as is known in the art.

The effective SNR generally represents an estimate of the transmission capacity of all utilized spatial channels, which is an accurate estimate for an AWGN channel but potentially not so accurate of an estimate for a multipath channel. The effective SNR may be used to select the common transmission mode for all spatial data streams sent on available spatial transmission channels. The selected transmission mode represents a prediction of the transmission rate that can be supported by the available transmission channels for achieving the desired packet error rate (PER). However, as with any prediction scheme, there may inevitably be prediction errors.

For certain embodiments, in order to ensure that the desired PER can be achieved, one or more back-off factors used for computation of effective SNR, using Eq. 6 above, may be modified in an "outer loop" of operations at 380 and applied again to update the effective SNR as shown in FIG. 3. This dynamic adjustment of back-off factors may help minimize prediction errors and, ultimately, help select a more efficient transmission mode.

Figure 5:
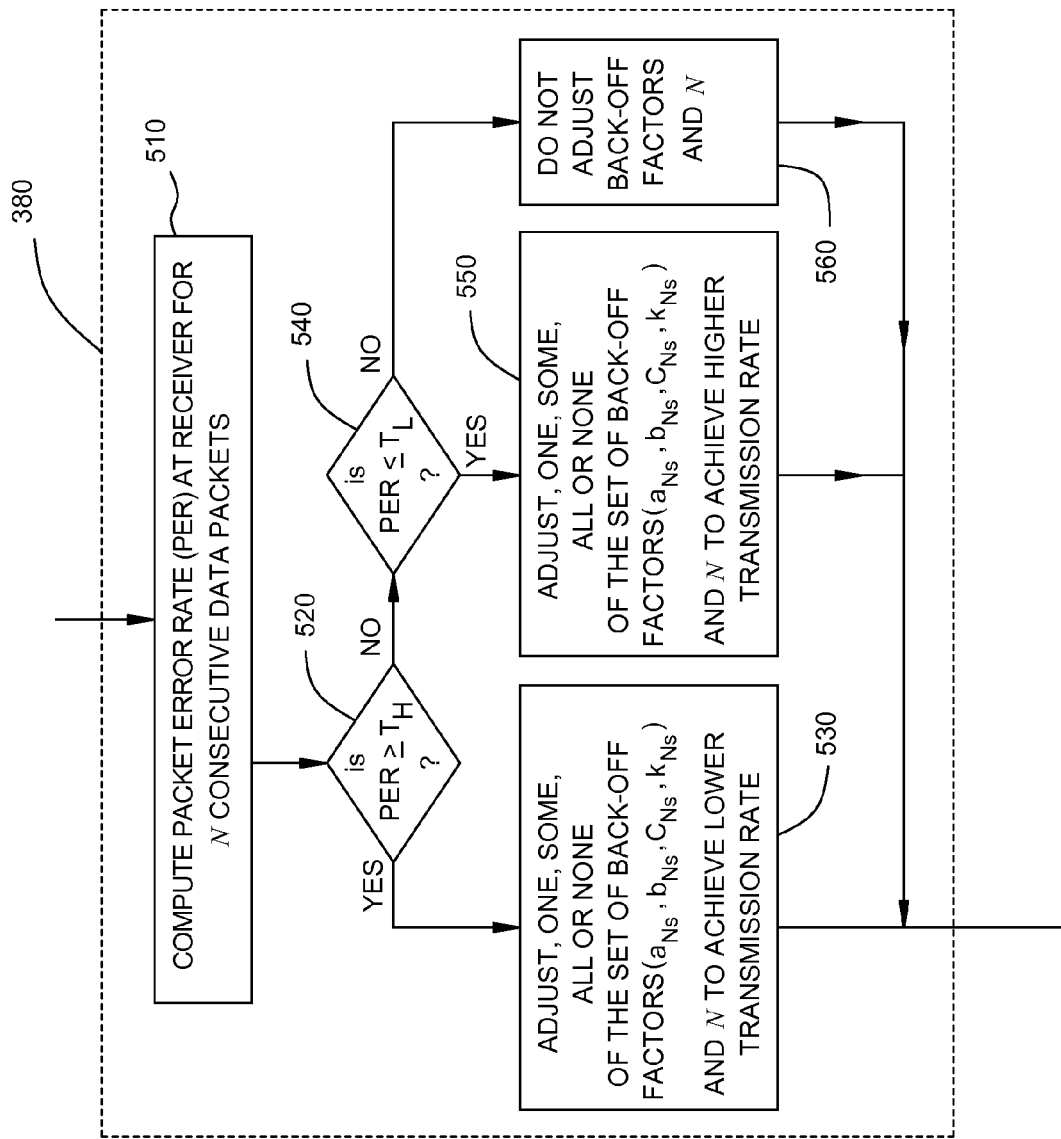
FIG. 5 illustrates example operations for adjusting back-off factors based on estimated packet error rate at the receiver.

The purpose of the outer loop at the receiver may be to control the maximum packet error rate (PER) in situations when a rate controller selects transmission rate that is either too low (conservative) or too high (aggressive). FIG. 5 illustrates example operations 380 for adjusting the transmission mode by modifying back-off factors for a plurality of spatial data streams based on the PER observed at the receiver.

At 510, the PER may be calculated at the receiver for N consecutive data packets. If the PER is outside the pre-determined threshold range ($T_L$, $T_H$), where $T_L \leq T_H$, then the controller 270 on FIG. 2 may modify the back-off factors in order to adjust the transmission mode.

If the PER for N consecutive received data packets is above the upper bound $T_H$, at 520, then the controller 270 may increase the back-off factor $k_{N_S}$ by a constant $\Delta_k$, at 530, in order to reduce the effective SNR and to decrease the transmission rate. For certain embodiments, the back-off factors $a_{N_S}$, $b_{N_S}$, and $C_{N_S}$ may be also decreased, at 530.

If the PER for N consecutive received data packets is below the lower threshold $T_L$, at 540, then the controller 270 may decrease the back-off factor $k_{N_S}$ by a constant $\Omega_k$, at 550. Optionally, the back-off factors $a_{N_S}$, $b_{N_S}$, and $C_{N_S}$ may be increased, at 550, in order to increase the effective SNR and to increase the transmission rate.

If the PER is within the pre-determined threshold range ($T_L$, $T_H$), then the controller 270 may not modify the back-off factors 560, and unchanged transmission mode is continued to be utilized.

The next time the rate selection algorithm is performed, the effective SNR for each spatial stream in each hypothesis may be computed using the updated values of the back-off factors, at 330 in FIG. 3. In this manner, a received packet or set of packets may be used to influence data rate selection for subsequent packet transmissions. The parameters $\Delta_k$, $\Omega_k$ and N may be constant for all cases, may vary with the number of streams in the hypothesis, antenna configuration, previously estimated effective SNR, or based on some other factor(s).

For certain embodiments, the outer loop at the receiver may also be utilized to influence the initial rate set by a device. For example, if the rate feedback is not updated for a pre-determined amount of time T, the outer loop may set any combination of back-off factors (e.g., to some type of default initial values) in order to obtain a conservative rate selection. This may correspond to any combination of the following: increasing $k_{N_S}$, decreasing $a_{N_S}$, decreasing $b_{N_S}$, and decreasing $C_{N_S}$ for a particular number of considered spatial streams $N_S$. In addition, the outer loop may control the number of spatial streams that are considered in the transmission rate selection by setting the appropriate parameters accordingly.

The above description has described calculating an effective SNR based on an average SNR and standard deviation of multiple spatial streams. However, for certain embodiments, rather than utilize an average SNR and standard deviation, a different type of SNR metric may be utilized to determine the effective SNR. For example, rather than calculate a true average SNR value based on SNR values of each spatial stream, a receiver may exclude the SNR values of certain spatial streams or weigh the SNR values of certain spatial streams more heavily when calculating an SNR metric used to determine an effective SNR. In any case, back-off parameters may still be adjusted, as described above, to influence the effective SNR calculation.

Open-Loop Rate Control

As described above, for certain embodiments, closed-loop rate control for MIMO systems may be accomplished, in which the rates are determined at the receiving end of the link and communicated back to the transmitter. For certain embodiments, however, open-loop rate control for MIMO systems may be accomplished, for example, where a receiving terminal does not provide rate feedback to the transmitter.

In such an open-loop rate control scheme, only a limited amount of information may be available at the transmitter, such as whether a transmitted packet was received in error. For example, the transmitter may know whether a transmitted packet (or a transmitted block of packets) was received in error based on a negative acknowledgement (NAK) sent by the receiver or the absence of a positive acknowledgement (ACK) sent from the receiver.

Certain embodiments of the present disclosure may allow for adjustments in transmission rate on one or more streams based on whether packets are received in error. These open-loop rate adjustments may be performed in the systems described above as an alternative to the closed-loop rate adjustments described above. For certain embodiments, closed-loop and open-loop rate adjustments may be combined, for example, with closed-loop rate selection performed only periodically, and open-loop rate adjustments made to a rate determined with the closed-loop rate selection. This may conserve bandwidth resources, for example, by reducing the frequency of effective SNR feedback.

As described above, for a system with $N_T$ antennas at an access point and $N_R$ antennas at a user terminal, the maximum number of spatial streams $N_S$ that may be used to transmit data is min($N_T$, $N_R$) Depending on the particular embodiment, the same rate may be used for all spatial streams or rates may be varied per spatial stream (with different rates selected for different streams). For certain embodiments, rates selected according to the open-loop technique presented herein may be restricted to the maximum number of allowed spatial streams. Furthermore, for certain embodiments, the same modulation may be used on all spatial streams.

The open-loop rate adjustment described herein may be utilized in a system, such as that shown in FIG. 1 and described above. For open-loop rate adjustment, however, certain components of the receiver 150, such as channel estimator 164 and transmission mode selector 166, may not be utilized.

Figure 6:
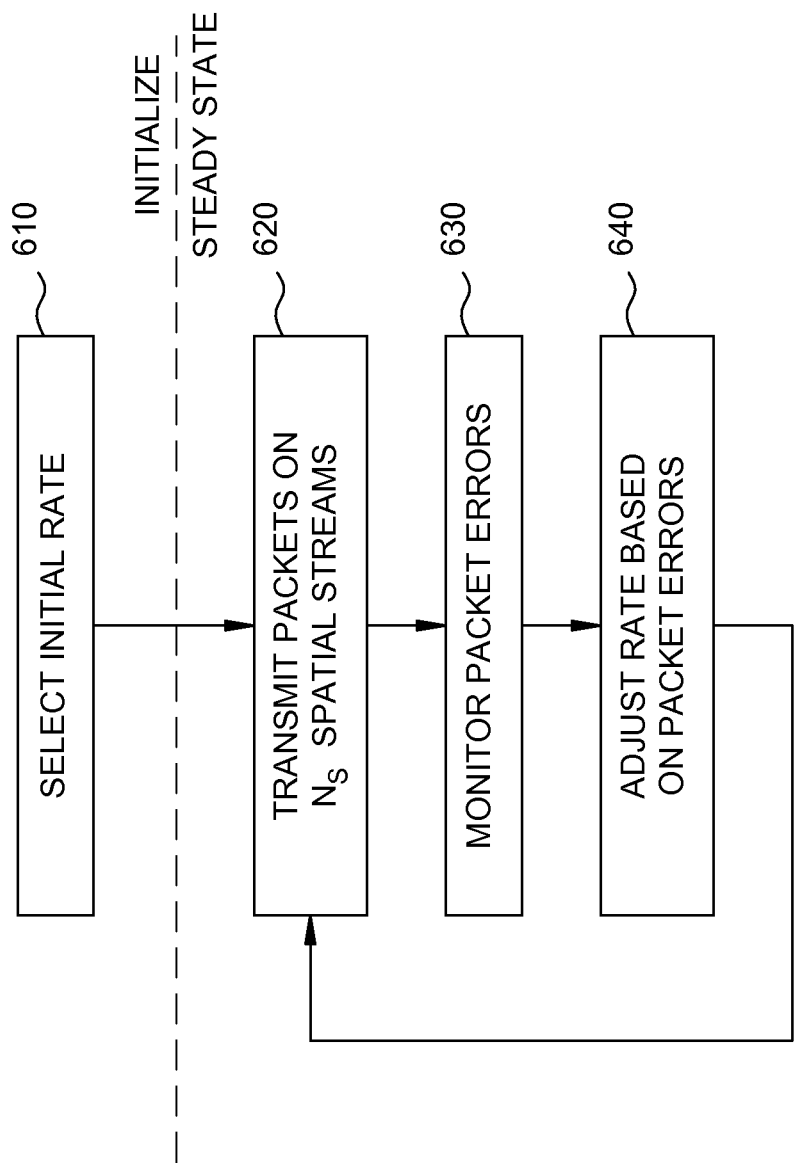
FIG. 6 illustrates example operations for open-loop rate adjustment.

FIG. 6 illustrates example operations that may be performed at a transmitter for open-loop rate control. At 610, an initial rate may be selected. At 620, one or more packets are transmitted on $N_S$ spatial streams. At 630, the transmitter monitors for errors in receiving the packets. At 640, the data rate is adjusted based on the packet errors. For example, the data rate may be increased if no (or few) packet errors are detected for some number of packets, decreased if some threshold number of packet errors are detected, or maintained at a current rate, for example, if a packet error rate is below a threshold level. The number of streams, as well as the rate per stream for certain embodiments that allow independent rate selection per stream, may also be adjusted.

Certain data rates may be achieved by more than one combination of modulation and coding schemes and number of active spatial streams. For certain embodiments, which combination is selected to achieve a desired data rate may depend on the receiver technique. For example, a particular receiver implementation may influence whether the smallest or largest number of spatial streams should be selected. For example, a near-ML receiver (a receiver that achieves performance near that of a maximum-likelihood receiver) may perform best with a higher number of spatial streams at a given rate. Thus, if a transmitter has information that a receiver is a near-ML receiver, the combination with the largest number of spatial streams may be selected in most cases (e.g., except when a single spatial stream achieves the same data rate). In cases where the transmitting device does not have receiver information, the combination with the smallest number of spatial streams may be selected. Further, for certain embodiments, different combinations of modulation and coding schemes may also be used to achieve the same data rate (without varying the number of spatial streams). Thus, in this case, a decision on which modulation and coding scheme to use may be based on, for example, which schemes are supported and/or other factors, such as which schemes are likely to result in better performance in a given situation.

For certain embodiments, an open-loop rate control algorithm may include two stages: initialization and steady state. Various techniques may be applied to select an initial rate during initialization.

Figure 7A:
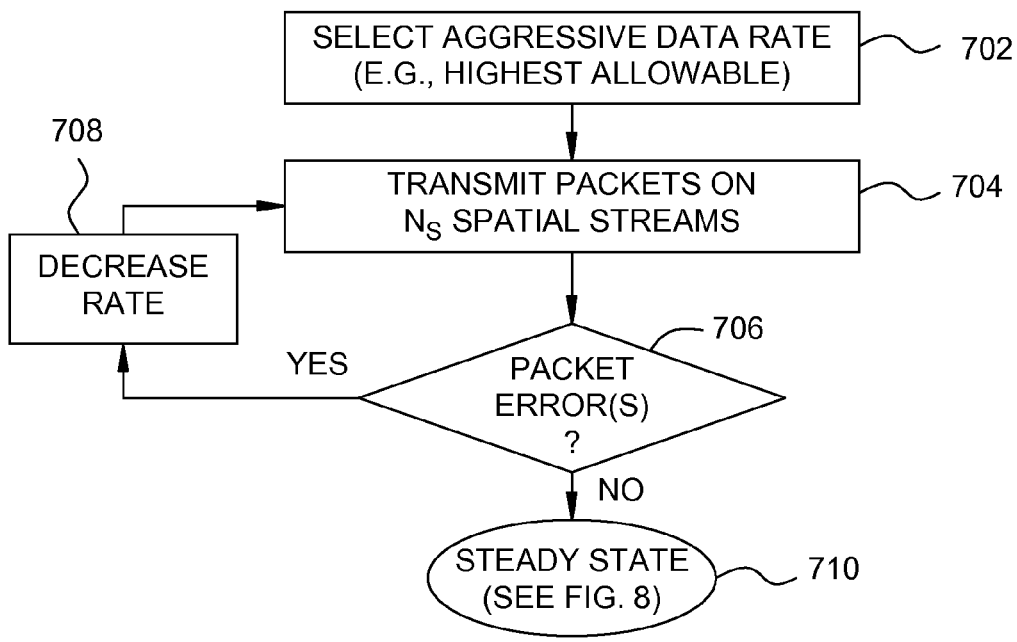
FIGS. 7A and 7B illustrate example initialization operations for open-loop rate adjustment.

As illustrated in FIG. 7A, the transmitter may start with an aggressive rate and decrease the rate until no (or few) packet errors are detected. For example, the transmitter may select the highest allowable rate, and associated number of streams, $N_S$, at 702, and transmit one or more packets on $N_S$ streams at that rate, at 704. If packet errors are detected, at 706, the rate may be decreased, at 708. These operations may be repeated, with the rate iteratively decreased until no (or an acceptable number of) packet errors are detected. The current rate at this point may be used as a steady state rate 710, which may be adjusted according to a different algorithm.

Figure 7B:
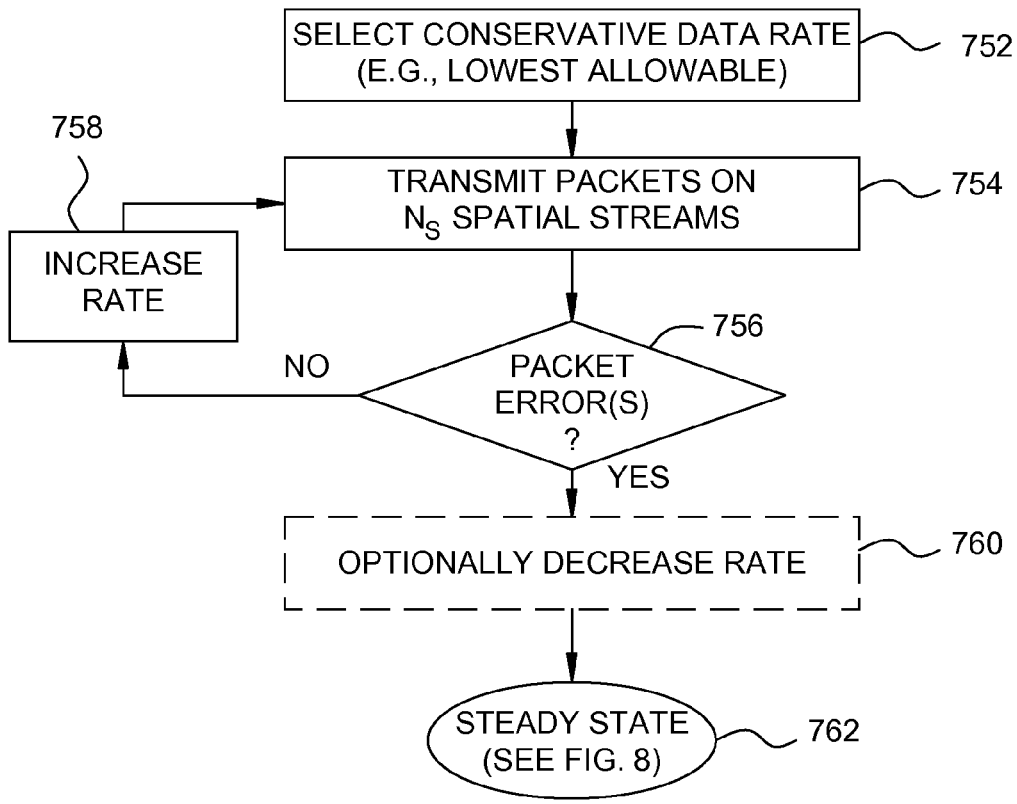

As illustrated in FIG. 7B, the transmitter may instead start with a conservative rate and increase the rate until packet errors are detected. For example, the transmitter may select the lowest allowable rate, at 752, and transmit one or more packets on $N_S$ spatial streams at that rate, at 754. If no packet errors (or relatively few packet errors based on a known criterion) are detected, at 756, the rate may be increased, at 758. These operations may be repeated, with the rate iteratively increased until packet errors are detected. Once packet errors are detected, the transmitter may optionally decrease this rate, at 760, and this rate may be used as the steady state rate 762. For certain embodiments, rather than starting with the most conservative or most aggressive data rate, a transmitter may start with a data rate somewhere in a middle of the data rate range. This initial "medium" data rate may be achieved by selecting a suitable combination of modulation and coding scheme and a number of spatial streams, for example, in a middle of the allowable range of spatial streams.

Figure 8:
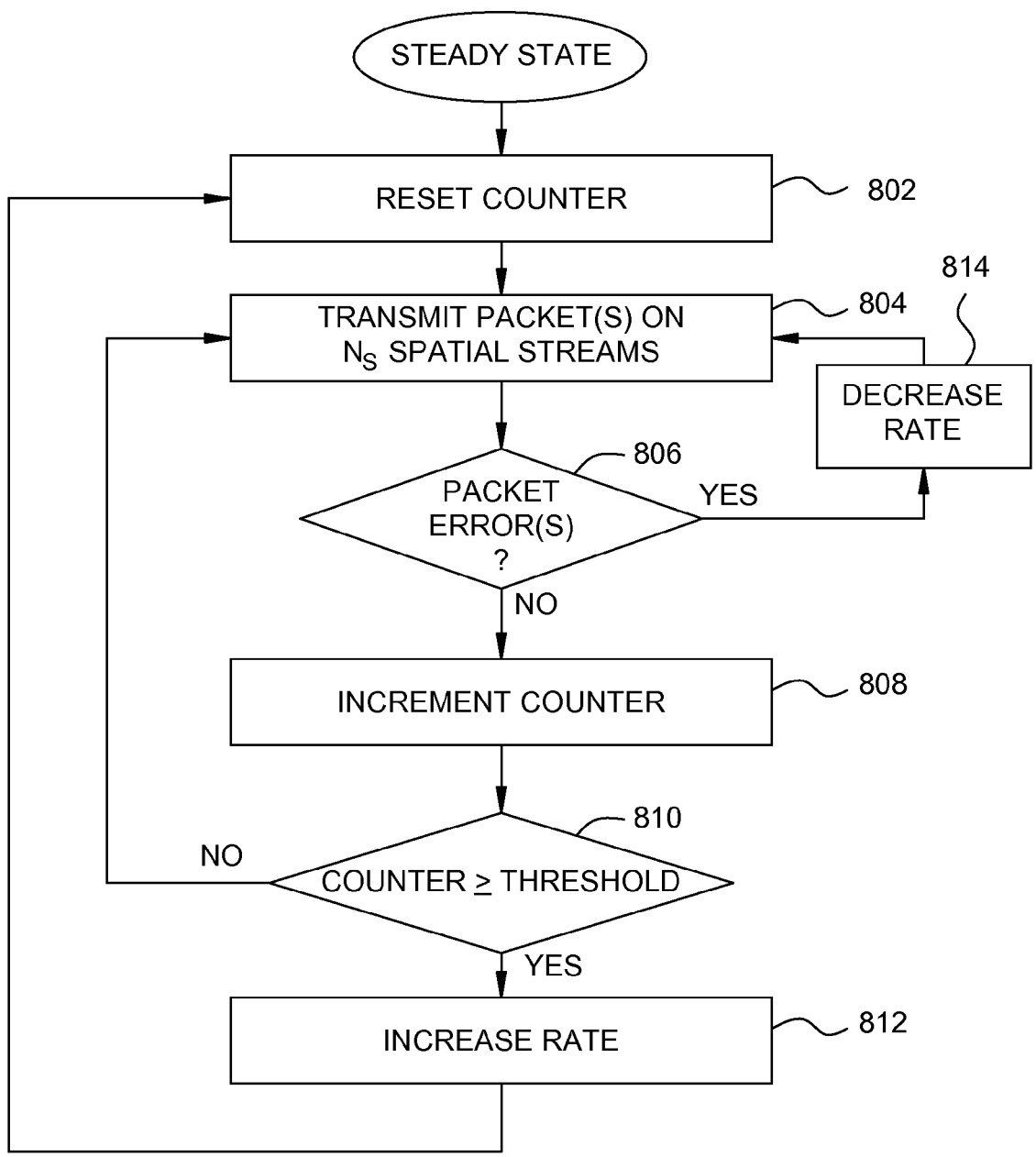
FIG. 8 illustrates example operations for steady state open-loop rate adjustment.

For certain embodiments, in the steady state, the rate may be adjusted in a controlled manner in an effort to achieve an optimally high overall data rate while minimizing packet errors. For example, as illustrated in FIG. 8, operations 800 may be performed to gradually increase the rate after some number of consecutive packets are transmitted without error, but to decrease the rate immediately if a packet error is detected.

At 802, a counter used to track successfully received packets is reset. At 804, one or more packets are transmitted on $N_S$ streams at the current rate. If no packet error is detected, at 806, the counter is incremented, at 808. If the counter meets or exceeds a threshold, as determined at 810, indicating a number of consecutive packets have been received successfully at that rate, the rate may be increased, at 812. The counter may again be reset, at 802, and the operations repeated at the new rate.

On the other hand, if packet errors are detected, at 806, the current rate may be decreased immediately, at 814. For certain embodiments, a current rate may not be decreased immediately, but rather may only be decreased after a threshold number of consecutive packets have been transmitted with errors (or a monitored packet error rate has exceeded some threshold value). For such embodiments, a counter for packets received in error may be maintained and used for comparison against a threshold.

Of course, those skilled in the art will appreciate that certain embodiments may utilize variations of the algorithms described above. For example, rather than increment or decrement rates by a single step, rates may be adjusted in steps of N, where N may be any integer (e.g., one, two, or three) depending on the size of the rate table. Further, for certain embodiments, different step sizes may be used for increases and decreases. For certain embodiments, initialization may begin with some rate other than the lowest or highest available rate. Further, in the initialization stage, more than one packet may be transmitted at any given data rate and, rather than adjust a rate based on a single packet error (or successfully received packet), a number of errors (or successfully received packets) may need to be detected before a current rate is adjusted.

For certain embodiments, rather than monitor absolute packet errors, packet error rates may be monitored and the steady state transmission rate may be adjusted accordingly. For example, the steady state rate may be increased if the packet error rate falls below a first threshold and/or decreased if the packet error rate exceeds a second threshold. The first and second thresholds may be set and/or monitored over different periods to ensure the rate is gradually increased when a low packet error rate is seen for an extended period of time, but rapidly decreased when a higher packet error rate is detected.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC- FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

Figure 3A:
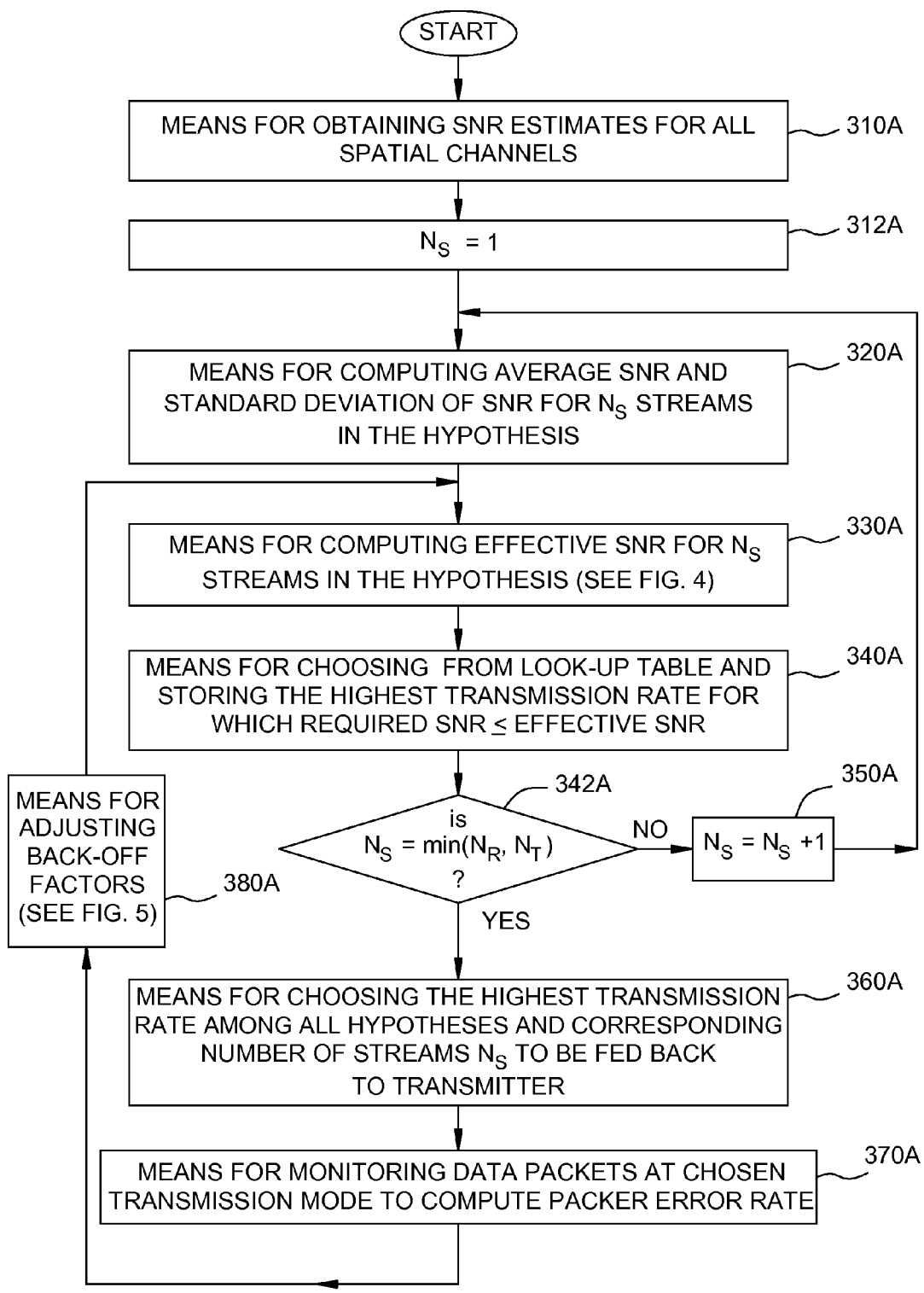
FIG. 3A illustrates example components capable of performing the operations illustrated in FIG. 3.
Figure 4A:
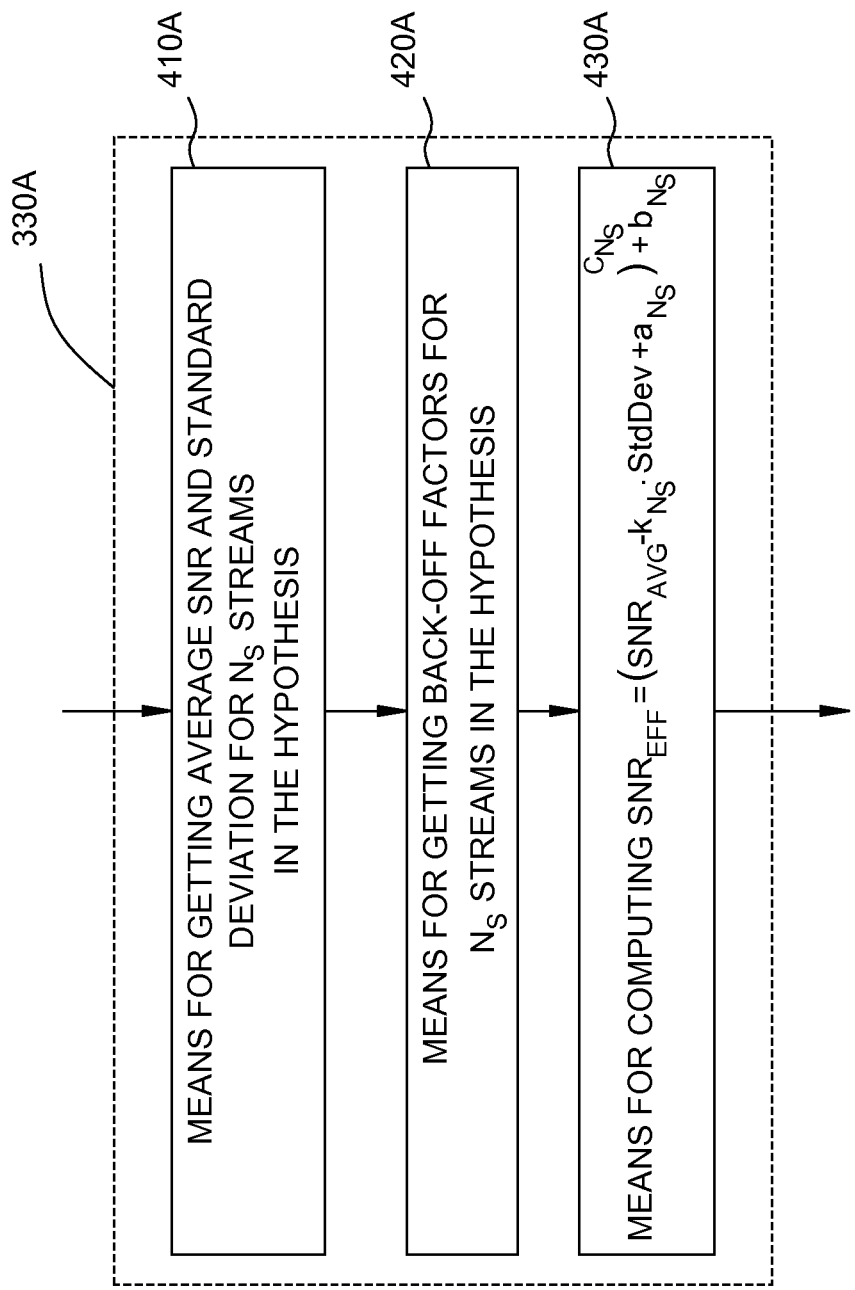
FIG. 4A illustrates example components capable of performing the operations illustrated in FIG. 4.
Figure 5A:
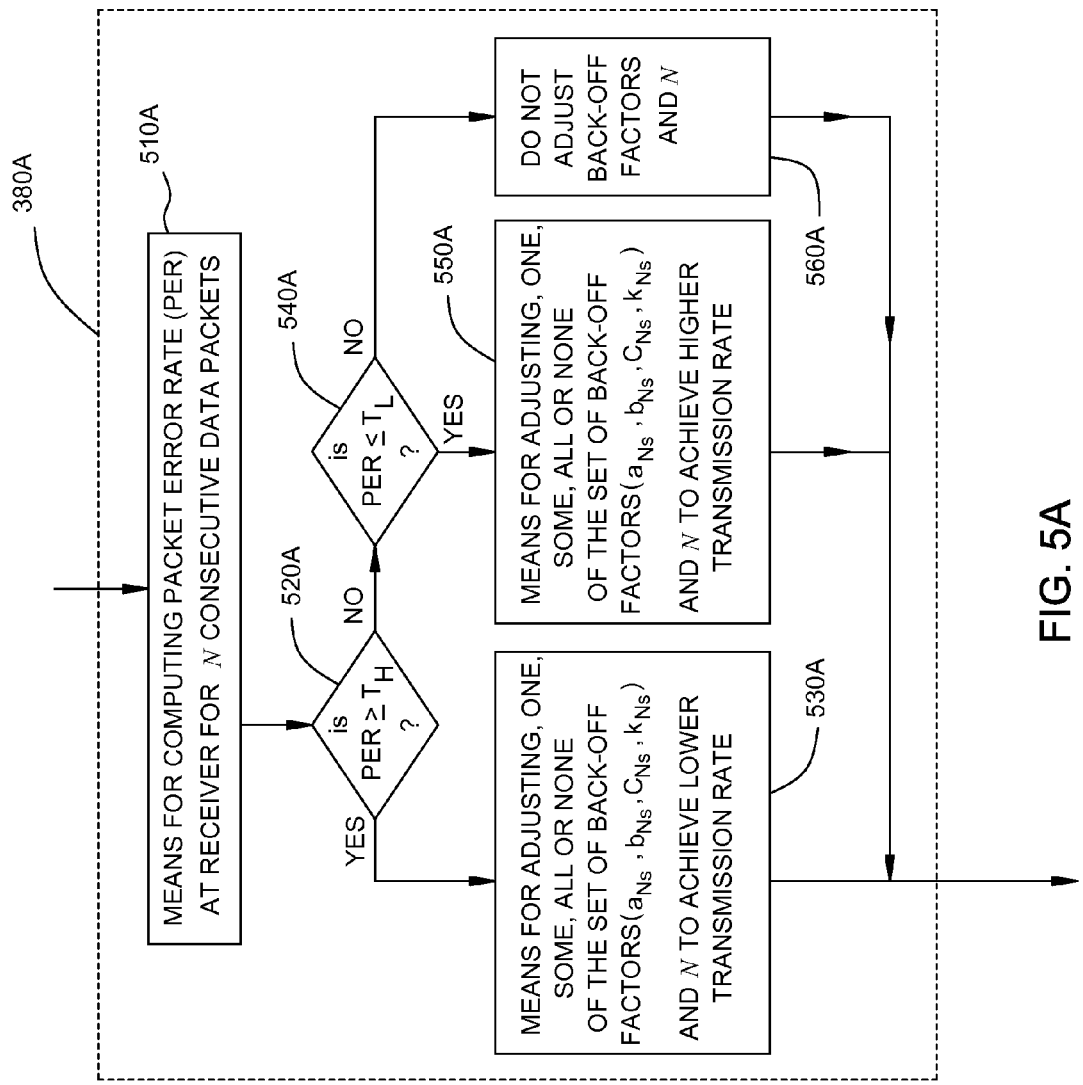
FIG. 5A illustrates example components capable of performing the operations illustrated in FIG. 5.
Figure 6A:
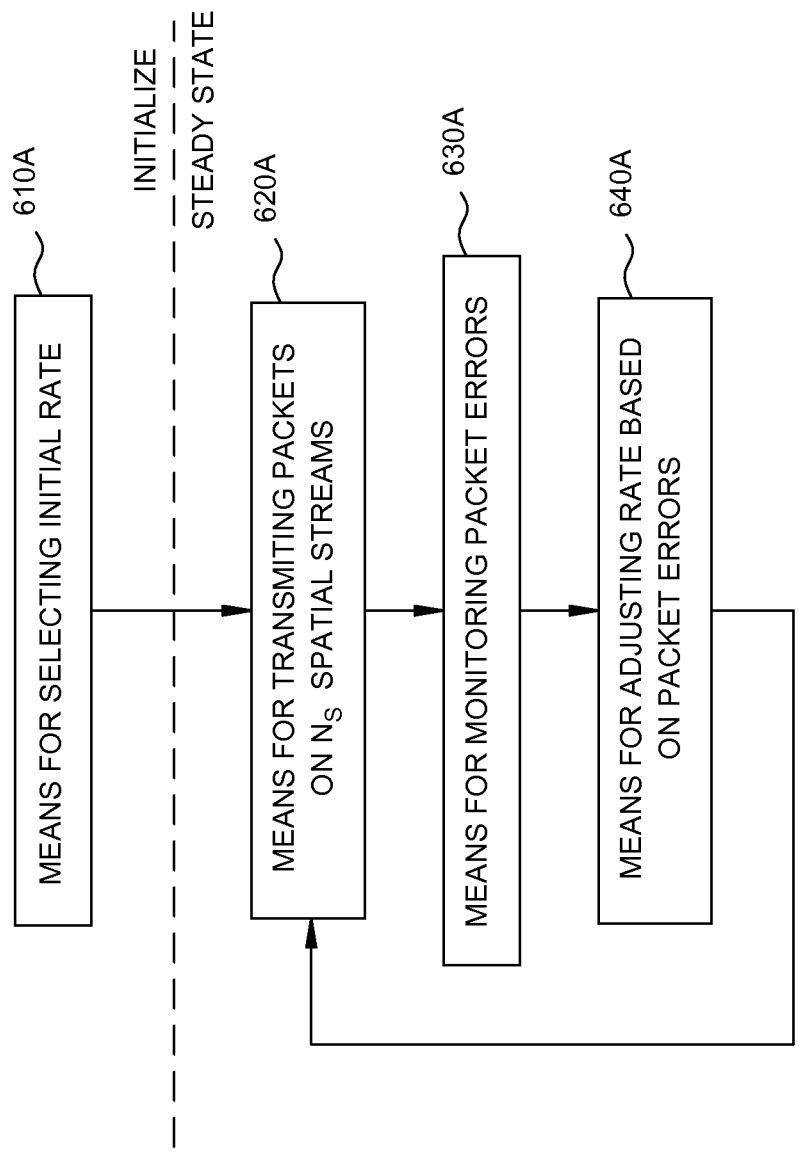
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 310-370 illustrated in FIG. 3 correspond to means-plus-function blocks 310A-370A illustrated in FIG. 3A. Similarly, blocks 410-430 illustrated in FIG. 4 correspond to means-plus-function blocks 410A-430A illustrated in FIG. 4A. Similarly, blocks 510-560 illustrated in FIG. 5 correspond to means-plus-function blocks 510A-560A illustrated in FIG. 5A. Similarly, blocks 610-640 illustrated in FIG. 6 correspond to means-plus-function blocks 610A-640A illustrated in FIG. 6A.

The techniques described herein may be implemented by various means. For example, these techniques may be implemented in hardware, software, or a combination thereof. For a hardware implementation, the units used for transmission mode selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmission mode selection may be implemented with modules (e.g., procedures, functions, and so on) that perform the functions described herein. The software codes may be stored in a memory unit (e.g., memory unit 242 or 272 in FIG. 2) and executed by a processor (e.g., controller 240 or 270). The memory unit may be implemented within the processor or external to the processor, in which case it can be communicatively coupled to the processor via various means as is known in the art.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for open-loop rate control for transmissions between a transmitting terminal and a receiving terminal in a multi-channel wireless communications system, comprising:
    transmitting one or more data packets using a plurality of spatial streams at a transmission rate, wherein the number of the plurality of spatial streams used is based on whether the transmitting terminal has information of a receiver's performance capability for detecting data packets; and
    adjusting the transmission rate for transmitting subsequent packets based on whether one or more of the transmitted data packets were received in error.

2. The method of claim 1, wherein adjusting the transmission rate for transmitting subsequent packets based on whether one or more of the transmitted data packets were received in error comprises:
    increasing the transmission rate for transmitting subsequent packets if a plurality of consecutive packets is successfully received.

3. The method of claim 1, wherein adjusting the transmission rate for transmitting subsequent packets based on whether one or more of the transmitted data packets were received in error comprises:
    decreasing the transmission rate for transmitting subsequent packets if one or more packets are not successfully received.

4. The method of claim 1, further comprising:
    monitoring a packet error rate for packets transmitted at a given transmission rate; and
    wherein adjusting the transmission rate for transmitting subsequent packets based on whether one or more of the transmitted data packets were received in error comprises increasing the transmission rate if the packet error rate falls below a first threshold and decreasing the transmission rate if the packet error rate exceeds a second threshold.

5. The method of claim 4, wherein the first and second thresholds are different values.

6. The method of claim 1, wherein adjusting the transmission rate for transmitting subsequent packets based on whether one or more of the transmitted data packets were received in error comprises:
    selecting a combination of modulation and coding schemes and number of spatial streams from a plurality of combinations of modulation and coding schemes and numbers of spatial streams that achieve the same transmission rate.

7. The method of claim 1, wherein adjusting the transmission rate for transmitting subsequent packets based on whether one or more of the transmitted data packets were received in error comprises:
    selecting a combination of modulation and coding schemes and number of spatial streams that achieves a next available higher transmission rate or a next available lower transmission rate relative to a current transmission rate.

8. The method of claim 1, wherein adjusting the transmission rate for transmitting subsequent packets based on whether one or more of the transmitted data packets were received in error comprises:
    adjusting the transmission rate according to a first algorithm during an initialization stage; and
    adjusting the transmission rate according to a second algorithm during a steady state.

9. The method of claim 8, wherein:
    the initialization stage begins by selecting a highest allowable transmission rate; and
    the transmission rate is iteratively reduced until no or few packet errors are detected.

10. The method of claim 8, wherein:
    the initialization stage begins by selecting a lowest allowable transmission rate; and
    the transmission rate is iteratively increased until packet errors are detected.

11. The method of claim 1, further comprising:
   determining an initial transmission rate based on a selected rate fed back from the receiving terminal;
   transmitting one or more data packets using the determined initial transmission rate; and
   adjusting the determined initial transmission rate for transmitting subsequent packets based on whether one or more of the transmitted data packets was received in error.

12. An apparatus for open-loop rate control for transmissions between a transmitting terminal and a receiving terminal in a multi-channel wireless communications system, comprising:
   a transmitter configured to transmit one or more data packets using a plurality of spatial streams at a transmission rate, wherein the number of the plurality of spatial streams used is based on whether the transmitting terminal has information of a receiver's performance capability for detecting data packets; and
   a circuit configured to adjust the transmission rate for transmitting subsequent packets based on whether one or more of the transmitted data packets were received in error.

13. The apparatus of claim 12, wherein the circuit configured to adjust the transmission rate for transmitting subsequent packets based on whether one or more of the transmitted data packets were received in error is also configured to:
   increase the transmission rate for transmitting subsequent packets if a plurality of consecutive packets is successfully received.

14. The apparatus of claim 12, wherein the circuit configured to adjust the transmission rate for transmitting subsequent packets based on whether one or more of the transmitted data packets were received in error is also configured to:
   decrease the transmission rate for transmitting subsequent packets if one or more packets are not successfully received.

15. The apparatus of claim 12, further comprising:
   a circuit configured to monitor a packet error rate for packets transmitted at a given transmission rate; and
   wherein the circuit configured to adjust the transmission rate for transmitting subsequent packets based on whether one or more of the transmitted data packets were received in error is also configured to increase the transmission rate if the packet error rate falls below a first threshold and decrease the transmission rate if the packet error rate exceeds a second threshold.

16. The apparatus of claim 15, wherein the first and second thresholds are different values.

17. The apparatus of claim 12, wherein the circuit configured to adjust the transmission rate for transmitting subsequent packets based on whether one or more of the transmitted data packets were received in error is also configured to:
   select a combination of modulation and coding schemes and number of spatial streams from a plurality of combinations of modulation and coding schemes and numbers of spatial streams that achieve the same transmission rate.

18. The apparatus of claim 12, wherein the circuit configured to adjust the transmission rate for transmitting subsequent packets based on whether one or more of the transmitted data packets were received in error is also configured to:
   select a combination of modulation and coding schemes and number of spatial streams that achieves a next available higher transmission rate or a next available lower transmission rate relative to a current transmission rate.

19. The apparatus of claim 12, wherein the circuit configured to adjust the transmission rate for transmitting subsequent packets based on whether one or more of the transmitted data packets were received in error is also configured to:
   adjust the transmission rate according to a first algorithm during an initialization stage; and
   adjust the transmission rate according to a second algorithm during a steady state.

20. apparatus of claim 19, wherein: the initialization stage begins by selecting a highest allowable transmission rate; and the transmission rate is iteratively reduced until no or few packet errors are detected.

21. The apparatus of claim 19, wherein: the initialization stage begins by selecting a lowest allowable transmission rate; and the transmission rate is iteratively increased until packet errors are detected.

22. The apparatus of claim 12, further comprising:
   another circuit configured to determine an initial transmission rate based on a selected rate fed back from the receiving terminal, wherein;
   the transmitter is also configured to transmit one or more data packets using the determined initial transmission rate, and
   the circuit is also configured to adjust the determined initial transmission rate for transmitting subsequent packets based on whether one or more of the transmitted data packets was received in error.

23. An apparatus for open-loop rate control for transmissions between a transmitting terminal and a receiving terminal in a multi-channel wireless communications system, comprising:
   means for transmitting one or more data packets using a plurality of spatial streams at a transmission rate, wherein the number of the plurality of spatial streams used is based on whether the transmitting terminal has information of a receiver's performance capability for detecting data packets; and
   means for adjusting the transmission rate for transmitting subsequent packets based on whether one or more of the transmitted data packets were received in error.

24. The apparatus of claim 23, wherein the means for adjusting the transmission rate for transmitting subsequent packets based on whether one or more of the transmitted data packets were received in error is configured to:
   increase the transmission rate for transmitting subsequent packets if a plurality of consecutive packets is successfully received.

25. The apparatus of claim 23, wherein the means for adjusting the transmission rate for transmitting subsequent packets based on whether one or more of the transmitted data packets were received in error is configured to:
   decrease the transmission rate for transmitting subsequent packets if one or more packets are not successfully received.

26. The apparatus of claim 23, further comprising:
   means for monitoring a packet error rate for packets transmitted at a given transmission rate; and
   wherein the means for adjusting the transmission rate for transmitting subsequent packets based on whether one or more of the transmitted data packets were received in error is configured to increase the transmission rate if the packet error rate falls below a first threshold and decrease the transmission rate if the packet error rate exceeds a second threshold.

27. The apparatus of claim 26, wherein the first and second thresholds are different values.

28. The apparatus of claim 23, wherein the means for adjusting the transmission rate for transmitting subsequent packets based on whether one or more of the transmitted data packets were received in error is configured to:
  select a combination of modulation and coding schemes and number of spatial streams from a plurality of combinations of modulation and coding schemes and numbers of spatial streams that achieve the same transmission rate.

29. The apparatus of claim 23, wherein the means for adjusting the transmission rate for transmitting subsequent packets based on whether one or more of the transmitted data packets were received in error is configured to:
  select a combination of modulation and coding schemes and number of spatial streams that achieves a next available higher transmission rate or a next available lower transmission rate relative to a current transmission rate.

30. The apparatus of claim 23, wherein the means for adjusting the transmission rate for transmitting subsequent packets based on whether one or more of the transmitted data packets were received in error is configured to:
  adjust the transmission rate according to a first algorithm during an initialization stage; and
  adjust the transmission rate according to a second algorithm during a steady state.

31. The apparatus of claim 30, wherein:
  the initialization stage begins by selecting a highest allowable transmission rate; and
  the transmission rate is iteratively reduced until no or few packet errors are detected.

32. The apparatus of claim 30, wherein:
  the initialization stage begins by selecting a lowest allowable transmission rate; and
  the transmission rate is iteratively increased until packet errors are detected.

33. The apparatus of claim 23, further comprising:
  means for determining an initial transmission rate based on a selected rate fed back from the receiving terminal;
  means for transmitting one or more data packets using the determined initial transmission rate; and
  means for adjusting the determined initial transmission rate for transmitting subsequent packets based on whether one or more of the transmitted data packets was received in error.

34. A computer-program product for open-loop rate control for transmissions between a transmitting terminal and a receiving terminal in a multi-channel wireless communications system, comprising a non-transitory computer-readable medium having instructions stored thereon, the instructions being executable by one or more processors and the instructions comprising:
  instructions for transmitting one or more data packets using a plurality of spatial streams at a transmission rate, wherein the number of the plurality of spatial streams used is based on whether the transmitting terminal has information of a receiver's performance capability for detecting data packets; and
  instructions for adjusting the transmission rate for transmitting subsequent packets based on whether one or more of the transmitted data packets were received in error.

35. The computer-program product of claim 34, wherein the instructions for adjusting the transmission rate for transmitting subsequent packets based on whether one or more of the transmitted data packets were received in error further comprise:
  instructions for increasing the transmission rate for transmitting subsequent packets if a plurality of consecutive packets is successfully received.

36. The computer-program product of claim 34, wherein the instructions for adjusting the transmission rate for transmitting subsequent packets based on whether one or more of the transmitted data packets were received in error further comprise:
  instructions for decreasing the transmission rate for transmitting subsequent packets if one or more packets are not successfully received.

37. The computer-program product of claim 34, wherein the instructions further comprise:
  instructions for monitoring a packet error rate for packets transmitted at a given transmission rate; and
  wherein the instructions for adjusting the transmission rate for transmitting subsequent packets based on whether one or more of the transmitted data packets were received in error further comprise instructions for increasing the transmission rate if the packet error rate falls below a first threshold and instructions for decreasing the transmission rate if the packet error rate exceeds a second threshold.

38. The computer-program product of claim 37, wherein the first and second thresholds are different values.

39. The computer-program product of claim 34, wherein the instructions for adjusting the transmission rate for transmitting subsequent packets based on whether one or more of the transmitted data packets were received in error further comprise:
  instructions for selecting a combination of modulation and coding schemes and number of spatial streams from a plurality of combinations of modulation and coding schemes and numbers of spatial streams that achieve the same transmission rate.

40. The computer-program product of claim 34, wherein the instructions for adjusting the transmission rate for transmitting subsequent packets based on whether one or more of the transmitted data packets were received in error further comprise:
  instructions for selecting a combination of modulation and coding schemes and number of spatial streams that achieves a next available higher transmission rate or a next available lower transmission rate relative to a current transmission rate.

41. The computer-program product of claim 34, wherein the instructions for adjusting the transmission rate for transmitting subsequent packets based on whether one or more of the transmitted data packets were received in error further comprise:
  instructions for adjusting the transmission rate according to a first algorithm during an initialization stage; and
  instructions for adjusting the transmission rate according to a second algorithm during a steady state.

42. The computer-program product of claim 41, wherein:
  the initialization stage begins by selecting a highest allowable transmission rate; and
  the transmission rate is iteratively reduced until no or few packet errors are detected.

43. The computer-program product of claim 41, wherein:
  the initialization stage begins by selecting a lowest allowable transmission rate; and
  the transmission rate is iteratively increased until packet errors are detected.

44. The computer-program product of claim 34, wherein the instructions further comprise:

instructions for determining an initial transmission rate based on a selected rate fed back from the receiving terminal;

instructions for transmitting one or more data packets using the determined initial transmission rate; and instructions for adjusting the determined initial transmission rate for transmitting subsequent packets based on whether one or more of the transmitted data packets was received in error.

* * * * *